(12) United States Patent
Nishimura

(10) Patent No.: US 7,036,305 B2
(45) Date of Patent: May 2, 2006

(54) EXHAUST GAS PURIFICATION DEVICE OF ENGINE FOR VEHICLE

(75) Inventor: Hiroyuki Nishimura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 16 days.

(21) Appl. No.: 10/895,133

(22) Filed: Jul. 21, 2004

(65) Prior Publication Data

US 2005/0050883 A1    Mar. 10, 2005

(30) Foreign Application Priority Data

Sep. 10, 2003   (JP) .............................. 2003-318239

(51) Int. Cl.
*F01N 3/00* (2006.01)
(52) U.S. Cl. .......................... 60/286; 60/289
(58) Field of Classification Search ................ 60/286, 60/295, 297
See application file for complete search history.

(56) References Cited

U.S. PATENT DOCUMENTS 4,538,411 A * 9/1985 Wade et al. ................. 60/274
4,884,398 A    12/1989 Morita et al.
5,121,601 A * 6/1992 Kammel ....................... 60/275
2003/0145582 A1* 8/2003 Bunting et al. ............... 60/297

FOREIGN PATENT DOCUMENTS

| DE | 101 08 720 A1 | 9/2002 |
|---|---|---|
| FR | 2 820 462 A | 8/2002 |
| JP | 04-86319 | 3/1992 |
| JP | 4 086319 A | 3/1992 |

\* cited by examiner

*Primary Examiner*—Thomas Denion
*Assistant Examiner*—Loren Edwards
(74) *Attorney, Agent, or Firm*—Nixon Peabody LLP; Donald R. Studebaker

(57) ABSTRACT

There are provided a particulate filter and a manual regeneration switch. When the manual regeneration switch is operated and the vehicle is in a stop state, the engine speed is adjusted to a first target higher than a normal idle speed to regenerate the filter. Meanwhile, when the vehicle changes from its stop state to its driving state, the engine speed is adjusted to a second target higher than the normal idle speed but lower than the first target in the event that the temperature of the filter is high, while the engine speed is adjusted to the normal idle speed in the event that the temperature of the filter is low. Accordingly, deterioration of the durability of the filter due to its rapid temperature increasing can be suppressed, avoiding disadvantages of fuel efficiency and vehicle start feeling.

8 Claims, 5 Drawing Sheets

Lapse of Time

EXHAUST GAS PURIFICATION DEVICE OF ENGINE FOR VEHICLE

BACKGROUND OF THE INVENTION

The present invention relates to an exhaust gas purification device of an engine for a vehicle, and more particularly, to an exhaust gas purification device of an engine for a vehicle which comprises a filter member disposed in an exhaust passage of the engine to trap exhaust particulates in an exhaust gas.

Conventionally, for example, a diesel engine is equipped with a filter member, so-called a particulate filter, which is disposed in an exhaust passage so as not to emit exhaust particulates of carbon or the like in its exhaust gas to an atmosphere.

In the engine with such a particulate filter, it is required to burn trapped particulates by the particulate filter and thereby regenerate the filter when the amount of tapped particulates has reached to a maximum value to be trapped at the filter. Accordingly, for example, Japanese Patent Laid-Open Publication No. 4-86319 discloses a device in which there is provided a manual switch operative to regenerate such a particulate filter and regeneration of particular filter is performed by increasing the amount of fuel injection of an engine for a while to raise an engine idle speed and thereby burn exhaust particulates trapped by the filter when the manual switch is switched on in a state of vehicle stop.

Herein, the above-described regeneration control is configured such that when it is determined that the state of the vehicle changes from the stop state to a driving state by detecting, for example, pressing of an accelerator pedal (so-called racing operation), or changing of shift range from its stop ranges (P range, N range) to its driving range (D range), the engine speed is so controlled as to return (decrease) to its specified normal idle speed, not to the above-described raised higher speed, because raising the engine speed to such higher speed may cause some problems in a start feeling for a vehicle driver.

However, the inventors of the present invention found out another problem that if the engine speed which has been raised once is returned to its specified normal idle speed soon after the above-described driver's intention to start the vehicle is detected during the regeneration of the particulate filter, the temperature of the particulate filer may increase too rapidly, thereby deteriorating the durability of the particulate filter.

Namely, the temperature of the particulate filter increases due to burning of the exhaust particulates during the regeneration, and if such returning of the engine speed to the specified normal idle speed is executed during this state where the temperature of the particulate filter is increasing, the amount of exhaust gas flowing into the particulate filter comes to decrease. Thus, a cooling function of particulate filter by the exhaust gas (a heat exchange between the exhaust gas and the particulate filter), i.e., the exhaust gas flowing in cools the particulate filter itself, may be reduced. As a result, the temperature of the particulate filter may increase too rapidly.

Accordingly, the inventors of the present invention considered countermeasures to this. Namely, when it is determined that the state of the vehicle changes from the stop state to the driving state during the regeneration of the particulate filter, the engine speed is so controlled as not to return to the specified normal idle speed, but to return to a specified engine speed which is slightly higher than the specified normal idle speed in order to suppress such improperly rapid temperature increasing of the particulate filter, avoiding any problem of start feeling of the vehicle.

However, there may occur further another problem of an improper fuel efficiency if the above-described engine speed control that the engine speed is returned to the specified engine speed slightly higher than the specified normal idle speed is always performed regardless of the temperature of the particulate filter. Namely, in the event that the temperature of the filter member is relatively low and thereby an improper influence of the above-described temperature increasing of particular filter is small, such controlling of the engine speed to the specified engine speed slightly higher than the specified normal idle speed may deteriorate the fuel efficiency.

SUMMARY OF THE INVENTION

The present invention has been devised in view of the above-described problems, and an object of the present invention is to provide an exhaust gas purification device of an engine for a vehicle which can suppress deterioration of the durability of a filter member due to its rapid temperature increasing, avoiding any disadvantages of a fuel efficiency and a start feeling of the vehicle.

The above-described object can be solved by the following present invention.

Namely, according to the present invention of claim 1, there is provided an exhaust gas purification device of an engine for a vehicle, comprising, a filter member disposed in an exhaust passage of the engine to trap exhaust particulates in an exhaust gas, a temperature detecting device operative to detect a temperature of the filter member, a manual regeneration switch operative by a passenger to commence regeneration of the filter member, a shift range position detecting sensor operative to detect a shift range position of a shift device of the vehicle, en engine speed adjusting device operative to adjust an engine speed, and a control unit operative to receive respective signals from the temperature detecting device, the manual regeneration switch and the shift range position detecting sensor, and output a control signal to the engine speed adjusting device, wherein the control unit is configured so as to output the control signal to adjust the engine speed in such manner that, (a) when the manual regeneration switch is operated and it is determined that the vehicle is in a stop state, the engine speed is adjusted to a first target speed which is higher than a specified normal speed and capable of substantially regenerating the filter member, (b) when the manual regeneration switch is operated and it is determined that a state of the vehicle changes from the stop state to a driving state, and (i) in the event that the temperature of the filter member is higher than a specified temperature, the engine speed is adjusted to a second target speed which is higher than the specified normal speed but lower than the first target speed, (ii) in the event that the temperature of the filter member is lower than the specified temperature, the engine speed is adjusted substantially to the normal engine speed.

Accordingly, since the engine speed is adjusted to the second target speed which is higher than the specified normal speed but lower than the first target speed when it is determined that the state of the vehicle changes from the stop state to the driving state and the regeneration of particulate filter is to be stopped in the event that the temperature of the filter member is higher than the specified temperature, the mount of exhaust gas flowing in the filter member can be reduced, thereby suppressing deterioration of the durability of the filter member, avoiding any disadvantages of the start feeling of the vehicle.

Further, since the engine speed is adjusted substantially to the normal engine speed when it is determined that the state of the vehicle changes from the stop state to the driving state in the event that the temperature of the filter member is lower than the specified temperature, deterioration of the fuel efficiency can be avoided properly.

According to the present invention of claim 2, the engine speed adjusting device includes a fuel injector which is disposed at a combustion cylinder of the engine, and the engine speed is adjusted by controlling the amount of fuel injected by the fuel injector.

Accordingly, since the engine speed is adjusted by controlling the amount of fuel injected by the fuel injector disposed at the combustion cylinder of the engine, an adjustment of the engine speed can be simply and properly.

According to the present invention of claim 3, there is provided an oxidation catalyst which is disposed in the exhaust passage upstream of the filter member, the fuel injector is configured so as to perform a main injection in which the fuel is injected during an engine compression stroke and a post injection in which the fuel is injected at near the top dead center of an engine expansion stroke, and the engine speed is adjusted by controlling the amount of fuel injected by the main injection.

Herein, it is not so preferable to increase the engine speed too high even though the increased engine speed is useful to regenerate the filter member during the vehicle stop. Because such high engine speed may cause a bad feeling or a concern to passengers of the vehicle.

Meanwhile, a method for regenerating the particulate filter is known in which there is provided an oxidation catalyst which is disposed in the exhaust passage upstream of the particulate filter, and a post injection is injected during an engine expansion stroke after a main injection, whereby a fuel injected by the post injection burns at the oxidation catalyst, thereby increasing the temperature of the exhaust gas flowing in the particulate filter effectively.

Accordingly, since the regeneration of the filter member is performed by both the engine speed increasing due to the main injection with increased fuel amount and the additional post injection, the exhaust gas temperature can be increased effectively and thereby the filter member regeneration can be performed properly, preventing the engine speed from increasing too high due to the main injection with increased fuel amount.

According to the present invention of claim 4, the temperature detecting device comprise a temperature sensor to detect directly the temperature of the filter member.

Also, according to the present invention of claim 5, the temperature detecting device is configured so as to detect indirectly the temperature of the filter member based on a lapse of time from the commencement of manual regeneration by the manual regeneration switch.

Accordingly, the temperature of the filter member can be detected directly or indirectly, thereby providing a proper control to suppress deterioration of the durability of the filter member due to its rapid temperature increasing.

According to the present invention of claim 6, the determination as to that the state of the vehicle changes from the stop state to the driving state is made at least based on the signal of the shift range position detecting sensor which relates to changing of a non-driving position from a driving position.

Also, according to the present invention of claim 7, the non-driving position is at least a P or N range, and the driving position is at least a D range.

Accordingly, the changing of the vehicle state from its stop state to its driving state can be determined simply and certainly.

According to the present invention of claim 8, there is further provided a parameter value detecting device operative to detect a parameter value which corresponds to the amount of the exhaust particulates trapped by the filter member, and a warning means to warn the passenger to commence the regeneration of the filter member when it is determined that the parameter value detected by the parameter value detecting device is greater than a specified value.

Accordingly, since it is warned to the passenger by the warning means that the mount of the exhaust particulates trapped by the filter member reach a specified amount, the passenger can commence the regeneration at its proper timing.

Other features, aspects, and advantages of the present invention will become apparent from the following description of the invention which refers to the accompanying drawings.

DETAILED DESCRIPTION OF THE INVENTION

Hereinafter, preferred embodiments of the present invention will be described with reference to the accompanying drawings.

Figure 1:
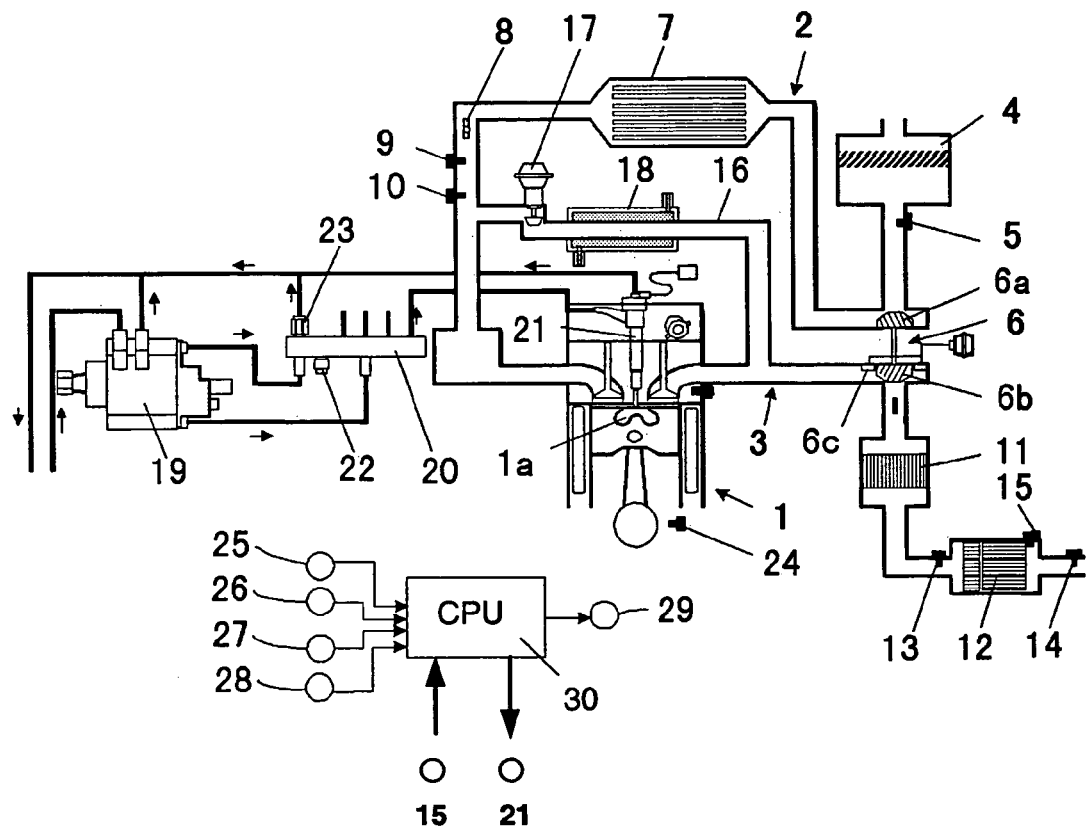
FIG. 1 is a block diagram of a system according to a preferred embodiment of the present invention.

FIG. 1 shows a system according to the present embodiment. A reference numeral 1 denotes a four-cylinder diesel engine, and the engine 1 is coupled with an intake passage 2 and an exhaust passage 3. In the intake passage 2, there are provided, from upstream to downstream, an air cleaner 4, an airflow sensor 5, a blower 6a of a VGT turbo charger 6 (a variable geometry turbo charger), an inter cooler 7, an intake throttle valve 8, an intake temperature sensor 9, and an intake pressure sensor 10. In the exhaust passage 3, there are provided, from upstream to downstream, a turbine 6b of the VGT turbo charger 6, a movable vane 6c to control the speed of an exhaust gas flowing into the turbine 6b, an oxidation catalyst 11, and a particulate filter 12.

Exhaust pressure sensors 13, 14 are provided upstream and downstream of the particulate filter 12 so as to detect the amount of exhaust particulates trapped by the particulate filter 12 based on a difference between respective pressures detected by the exhaust pressure sensors 13, 14. Further, there is provided a temperature sensor 15 at the particulate filter 12.

Also, there is provided an exhaust gas recirculation passage 16 to connect the intake passage 2 with the exhaust passage 3, in which a negative-pressure actuator type of exhaust gas recirculation valve 17 and a cooler 18 to cool the exhaust gas by an engine coolant are provided.

A reference numeral 19 denotes a fuel injection pump, which supplies fuel from a fuel tank (not illustrated) to a common rail 20 as an accumulator. The common rail 20 connects with a fuel injector 21 (only one illustrated in FIG. 1) which is disposed at a combustion chamber 1a of each engine cylinder. The common rail 20 is also provided with a fuel injection pressure sensor 22 and a safety valve 23 which is operative to open and relieve some fuel to the fuel tank when the fuel pressure in the common rail 19 exceeds an allowable pressure.

A reference numeral 24 denotes a crank angle sensor to detect an engine speed, a reference numeral 25 denotes a vehicle speed sensor, a reference numeral 26 denotes an accelerator sensor to detect how much an accelerator pedal (not illustrated) is pressed, and a reference numeral 27 denotes a range position detecting sensor to detect a shift range position for an automatic transmission.

A reference numeral 28 denotes a manual regeneration switch to commerce regeneration of the particulate filter 12, and a reference numeral 29 denotes a warning lamp to warn a passenger to commence the regeneration of the particulate filter 12 when the trapped exhaust particulates at the particulate filter 12 becomes greater than a specified amount. These switch and lamp are provided at an instrument panel (not illustrated).

A control unit is denoted by a reference numeral 30, which is operative to receive detection signals from respective sensors and switches, and to control respective actuators, such as the intake throttle valve 8, movable vane 6c, exhaust gas recirculation valve 17, fuel injector 21, based on respective inputted detection signals.

Further, the manually operated regeneration of the particulate filter 12 is performed by a fuel injection control via the fuel injector 21.

Figure 2:
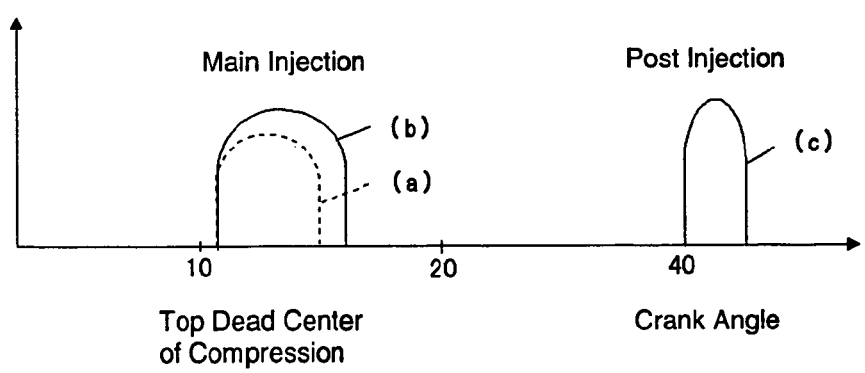
FIG. 2 is an explanatory diagram for describing manual regeneration by a main injection and a post injection according to a first embodiment of the present invention.

Specifically, as shown in FIG. 2, only a main injection shown in a broken line (a), in which the fuel is injected at near the top dead center of an engine compression stroke, is executed during the normal period. During the regeneration period, however, a specified amount of fuel, which is required to increase the engine speed from a normal idle speed (for example, 750 rpm) to a first target speed for the manually operated regeneration (for example, 1750 rpm), is added to the normal main injection as shown in a solid line (b), and a post injection is subsequently executed as shown in a solid line (c) during an engine expansion stroke after the main injection.

Accordingly, increasing of the exhaust gas flow amount due to increasing of the fuel amount by the main injection can be attained, and increasing of the temperature of the exhaust gas flowing into the particulate filter 12 due to a post combustion of the post injection at the oxidation catalyst 11 can be attained effectively. As a result, the exhaust particulates trapped by the particulate filter 12 can be burned off, thereby regenerating the particulate filter 12.

Embodiment 1

Next, a manually operated regeneration control for the particulate filter 12 according to a first embodiment will be described referring to a flowchart of FIG. 3.

Figure 3:
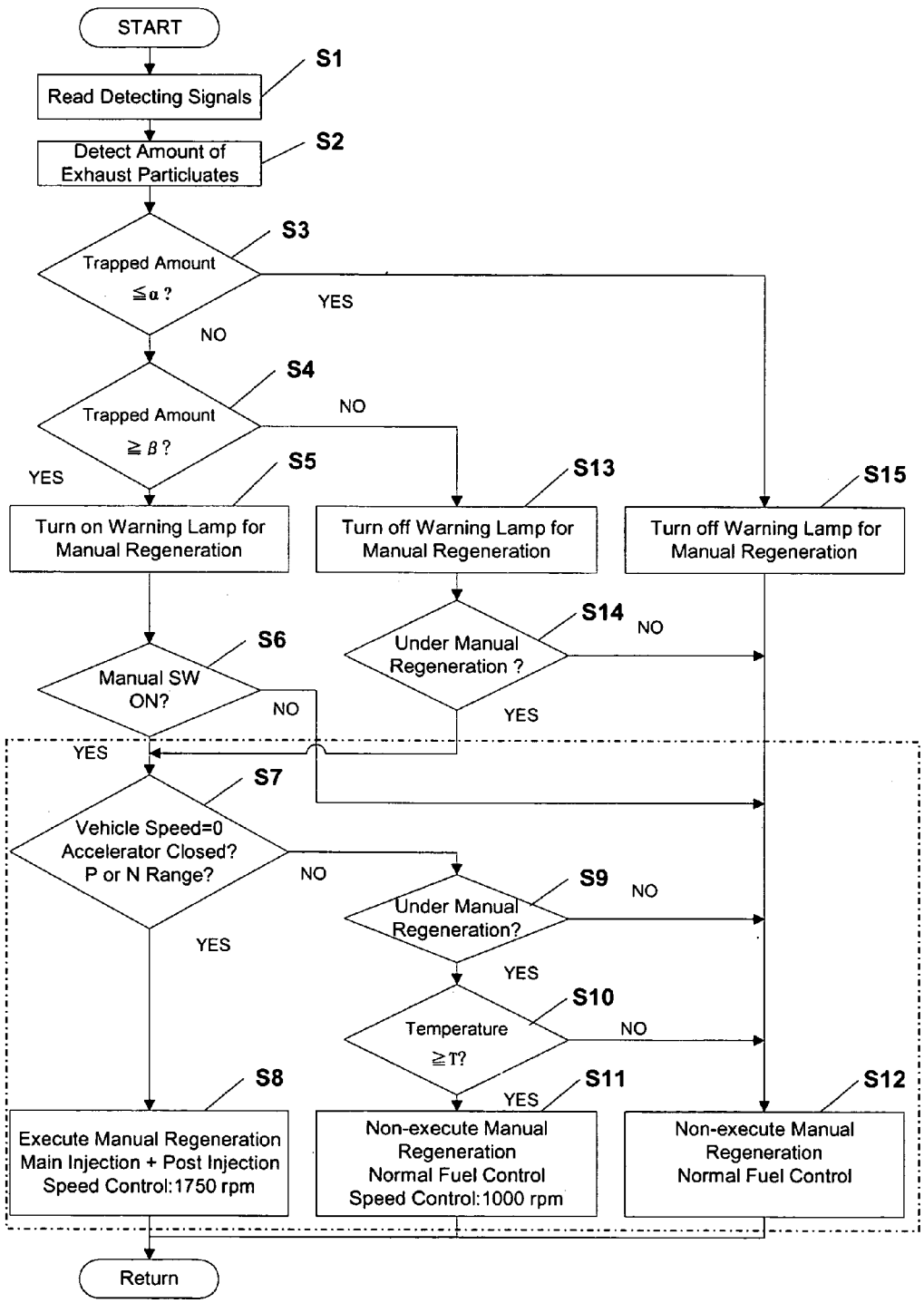
FIG. 3 is a flowchart for a control according to the first embodiment of the present invention.

In step S1 of FIG. 3, respective detection signals from the exhaust pressure sensors 13, 14, temperature sensor 15, crank angle sensor 24, vehicle speed sensor 25, accelerator sensor 26, range position detecting sensor 27 and manual regeneration switch 28 are read in.

Subsequently, in step S2, the amount of exhaust particulates trapped by the particulate filter 12 is detected based on the pressure difference according to the exhaust pressure sensors 13, 14. Namely, according to increasing of the trapped particulates, the pressure of the exhaust gas upstream of the particulate filter 12 increases and thereby the above-described pressure difference becomes greater. Accordingly, the amount of exhaust particulates trapped by the particulate filter 12 can be detected based on the pressure difference.

In step S3, it is determined whether or not the trapped amount detected in step S2 is a first specified amount a (near zero) or less. When the answer to step S3 is No, i.e., the trapped amount is greater than the first specified amount $\alpha$, it is then determined whether or not the trapped amount is a second specified amount $\beta$ (corresponding to a maximum amount to be trapped), which is greater than the first specified amount $\alpha$, or more.

When the answer to step S4 is Yes, i.e., it is determined that the trapped amount has reached to the maximum amount, the sequence proceeds to step S5, where the warning lamp 29 is turned on to encourage the passenger to perform the manual regeneration.

Next, in step S6, it is determined whether or not the manual regeneration switch 28 is ON, i.e., it is switched to a regeneration state or not. When the answer to step S6 is Yes, the sequence proceeds to step S7, where it is determined whether or not the vehicle is in a stop state. More specifically, when the vehicle speed is zero, the amount of the pressed accelerator is zero (fully closed accelerator opening), and the range position is located in P or N range, it is determined that the vehicle is in the stop state.

When the answer to step S7 is Yes, i.e., conditions for the regeneration has been satisfied with the manual regeneration switch 28 ON and the vehicle stop, the sequence proceeds to step S8, where the above-described manual regeneration is executed. Meanwhile, when the answer to step S7 is No, i.e., the accelerator pedal is pressed from its closed state, or the shift range is shifted from P or N range (non-driving position) to D range (driving position), the sequence proceeds to step S9, where it is determined whether the manual regeneration is underway or not.

When the answer to step S9 is Yes, the sequence proceeds to step S10, where it is determined whether or not the temperature of the particulate filter 12 is a specified temperature T (for example, 300° C.) or more.

When the answer to step S10 is Yes, the sequence proceeds to step S11. Namely, when it is determined that the state of the vehicle changes from the stop state to the driving state based on the accelerator pedal position or the shift change from P or N ranges to D range and the temperature of the particulate filter 12 is high, returning the engine speed from the first target speed (1750 rpm) adjusted in step S8 to the normal idle speed (750 rpm) for non-regeneration may increase the temperature of the particulate filter 12 too high due to reducing of the exhaust gas amount. Therefore, in this case, the sequence proceeds to step S11, where the manual regeneration is cancelled to return to the normal fuel control and the engine speed is adjusted to a second target speed (for example, 1000 rpm) which is lower than the first target speed but higher than the normal target speed (750 rpm) for non-regeneration.

Further, when the answer to step S9 or S10 is No, the sequence proceeds to step S12, where the manual regeneration is cancelled to return to the normal fuel control. This is because prompt returning of the engine speed to the normal speed (750 rpm) in this case may not increase the temperature of the particulate filter 12 so high due to the non-execution state of manual regeneration or the low temperature of the particulate filter 12.

Also, when the answer to step S4 is No, i.e., the amount of exhaust particulates reduces by burning and becomes less than the second specified amount β, the sequence proceeds to step S13, where the warning lamp 29 is turned off.

Subsequently, it is determined whether the manual regeneration is underway or not in step S14. When the answer is Yes, the sequence proceeds to step S7. Meanwhile, when the answer is No, the sequence proceeds to step S12, where the manual regeneration is brought to a non-execution state.

Also, when the answer to step S3 is Yes, i.e., the amount of exhaust particulates is less than the first specified amount a and few exhaust particulates are trapped by the particulate filter 12, the sequence proceeds to step S15, where the warning lamp 29 is turned off. Subsequently, the sequence proceeds to step S12, where the manual regeneration is brought to the non-execution state.

Next, the manual regeneration control described above will be described referring to a time chart of FIG. 4.

Figure 4:
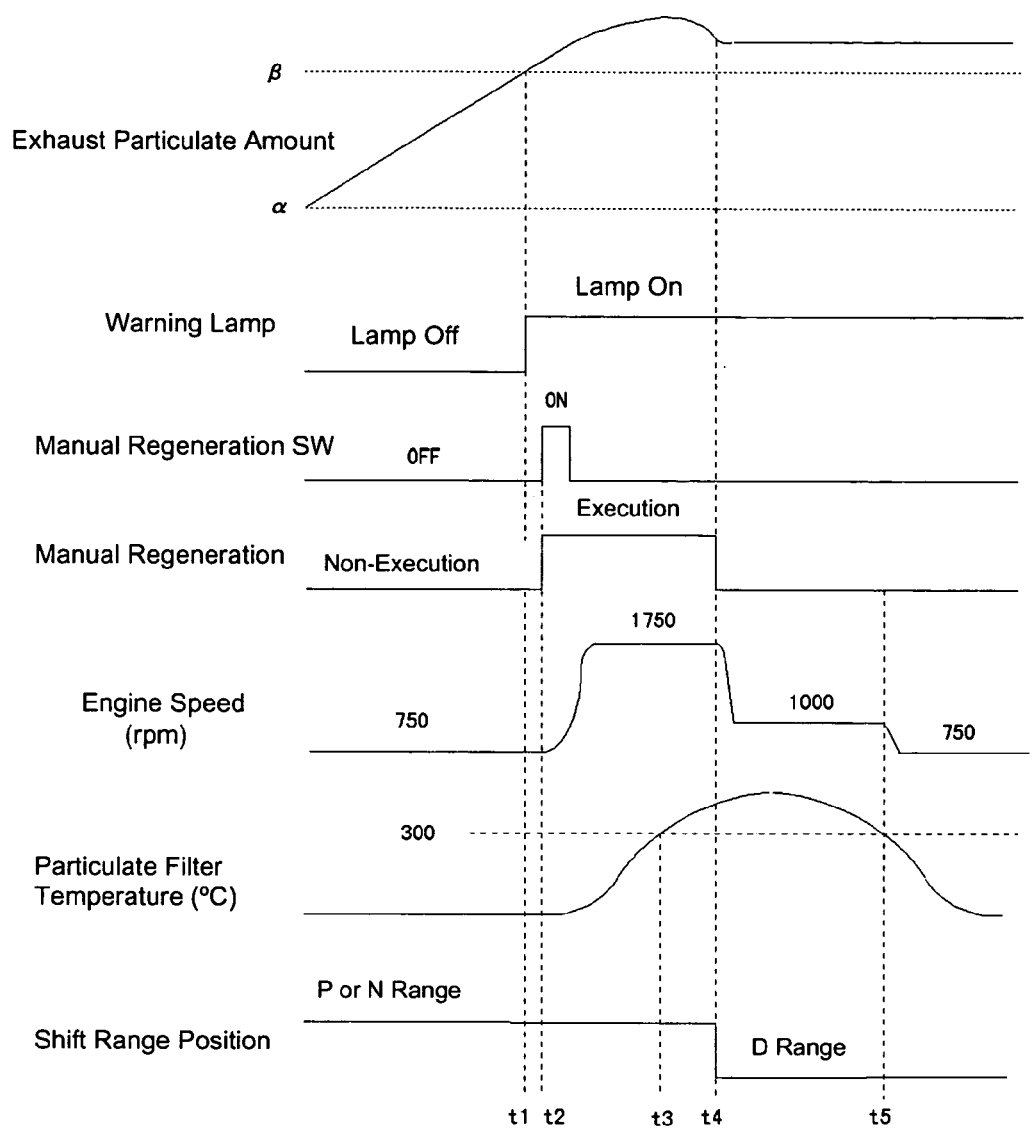
FIG. 4 is a time chart according to the first embodiment of the present invention.

As shown in FIG. 4, when the amount of exhaust particulates reaches the second specified amount β, the warning lamp 29 is turned on (at t1 point). The passenger turns on the manual regeneration switch 28 when noticing the warning lamp 29 on, and then the manual regeneration starts (at t2 point).

After the manual regeneration starts, the temperature of the particulate filter 12 increases to the specified temperature (300° C.) (at t3 point). Herein, when the shift range position is shifted from P or N range to range D during the manual regeneration (at t4 point), the engine speed is adjusted not to the normal idle speed (750 rpm) for non-regeneration but to the second target speed (1000 rpm) while the temperature of the particulate filter 12 is higher than the specified temperature T (300° C.). Namely, if the engine speed is adjusted soon so as to return to the normal idle speed (750 rpm) for non-regeneration from the first target speed (1750 rpm) at this moment, the amount of exhaust gas flowing into the particular filter 12 quickly reduces and thereby the temperature of the particular filter 12 may increase too high promptly. To prevent this situation, the engine speed is adjusted so as to return to the second target speed (1000 rpm) which is higher than the normal idle speed (750 rpm) until the temperature of the particulate filter 12 decreases below the specified temperature T (300° C.).

Meanwhile, if the temperature of the particulate filter 12 detected at the time the shift range position is shifted from P or N range to range D during the manual regeneration is lower than the specified temperature T (300° C.), the engine speed is adjusted to return to the normal idle speed (750 rpm) from the first target speed (1750 rpm) soon (not illustrated in FIG. 4).

Further, in the first embodiment, the shift range position is shifted from P or N range to range D and the manual regeneration is cancelled before the amount of the exhaust particulates becomes less than the second specified amount β. Accordingly, the warning lamp 29 is maintained to be on without being turned off.

As described above, according to the first embodiment, since the engine speed is adjusted to the second target speed (1000 rpm) which is higher than the specified normal idle speed (750 rpm) but lower than the first target speed (1750 rpm) when the shift range position is shifted from P or N range to D range during the manual generation in the event that the temperature of the particulate filter 12 is higher than the specified temperature T, the amount of exhaust gas flowing in the particulate filter 12 can be reduced, thereby suppressing increasing of the temperature of the particulate filter 12, avoiding any disadvantages of the start feeling of the vehicle.

Further, since the engine speed is adjusted to the normal idle speed (750 rpm) when the shift range position is shifted from P or N range to D range during the manual generation in the event that the temperature of the particulate filter 12 is lower than the specified temperature T, the engine speed is adjusted so as to return to the normal idle speed (750 rpm) from the first target speed (1750 rpm) soon, deterioration of the fuel efficiency can be avoided properly.

Further, since the regeneration of the particulate filter 12 is performed by both the engine speed increasing by use of the main injection with increased fuel amount and the additional post injection, the exhaust gas temperature can be increased effectively and thereby the particulate filter 12 regeneration can be performed properly, preventing the engine speed from increasing too high due to the main injection with increased fuel amount.

Further, since it is warned to the passenger by the warning means that the mount of the exhaust particulates trapped by the particulate filter 12 reaches the specified amount β, the passenger can switch on the manual regeneration switch 28 to commence the regeneration at its proper timing.

Embodiment 2

Next, the manual regeneration control of the particulate filter 12 according to a second embodiment will be described referring to FIGS. 5 and 6.

The first embodiment described above describes an example in which the determination as to which one of the second target speed and the normal idle speed for non-regeneration is selected when the shift range position is shifted from P or N range to D range is made based on the temperature of the particulate filter 12 detected directly by the temperature sensor 15. The second embodiment, however, describes an example in which the temperature of the particulate filter 12 is detected indirectly (presumed) based on a lapse of time from the commencement of manual regeneration, instead of detecting the temperature directly, and thereby the determination as to which one of the above speeds is selected is made.

Figure 5:
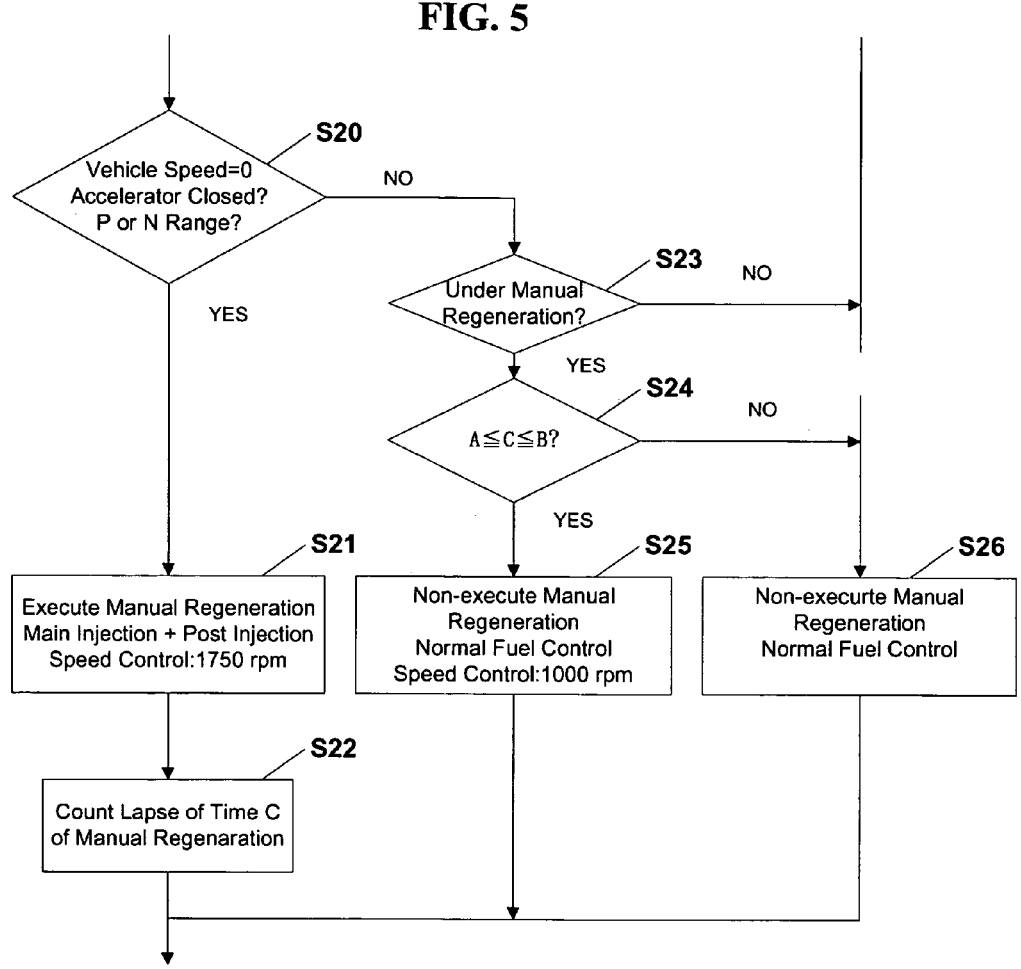
FIG. 5 is a flowchart for a control according to a second embodiment of the present invention.
Figure 6:
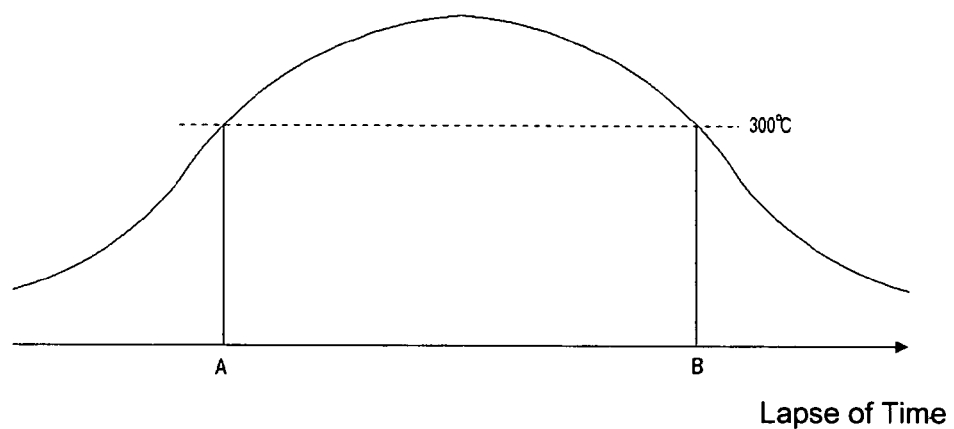
FIG. 6 is a diagram showing a temperature state of a particulate filter according to the second embodiment of the present invention.

FIG. 5 shows only part of flowchart according to the second embodiment which is different from that enclosed by a solid line in FIG. 3 according to the first embodiment, and the difference of the second embodiment from the first embodiment will be described referring to this part of flowchart.

In step S20 of FIG. 5, it is determined whether the vehicle is in the stop state or not. More specifically, like the first embodiment, when the vehicle speed is zero, the amount of the pressed accelerator is zero (fully closed accelerator opening), and the range position is located in P or N range, it is determined that the vehicle is in the stop state.

When the answer to step S20 is Yes, i.e., conditions for the regeneration has been satisfied with the manual regeneration switch 28 ON and the vehicle stop, the sequence proceeds to step S21, where the above-described manual regeneration is executed. Specific contents of this manual regeneration is the same as step S8 of FIG. 3.

Subsequently, a lapse of time C from the commencement of the manual regeneration is counted in step S22.

Also, when the answer to step S20 is No, i.e., the accelerator pedal is pressed from its closed state, or the shift range position is shifted from P or N range to D range, the sequence proceeds to step S23, where it is determined whether the manual regeneration is underway or not.

When the answer to step S23 is Yes, the sequence proceeds to step S24, where it is determined whether or not the lapse of time C counted in step S22 is within a time range A–B which corresponds to a state where the temperature of the particulate filter 12 is a specified temperature T (for example, 300° C.) or more.

Herein, the reason the temperature is low until the lapse of time C reaches A is because the combustion of exhaust particulates has not advanced sufficiently. Meanwhile, the reason the temperature is low after the lapse of time C reaches B is because the combustion of exhaust particulates has advanced enough and the mount of exhaust particulates to be burned has decreased, resulting in an inactive combustion.

When the answer to step S24 is Yes, the sequence proceeds to step S25. Namely, during the manual regeneration, when it is determined that the state of the vehicle changes from the stop state to the driving state based on the shift change from P or N ranges to D range and when it is presumed that the temperature of the particulate filter 12 is the specified temperature T (300° C.) or more based on the lapse of time C within the time range A–B, returning the engine speed from the first target speed (1750 rpm) to the normal idle speed (750 rpm) for non-regeneration may increase the temperature of the particulate filter 12 too high due to reducing of the exhaust gas amount. Therefore, in this case, the sequence proceeds to step S25, where the manual regeneration is cancelled to return to the normal fuel control and the engine speed is adjusted to the second target speed (for example, 1000 rpm) which is lower than the first target speed but higher than the normal target speed (750 rpm) for non-regeneration.

Further, when the answer to step S23 or S24 is No, the sequence proceeds to step S26, where the manual regeneration is cancelled to return to the normal fuel control. This is because prompt returning of the engine speed to the normal speed (750 rpm) in this case may not increase the temperature of the particulate filter 12 so high due to the non-execution state of manual regeneration or the low temperature of the particulate filter 12.

As described above, according to the second embodiment like the first embodiment, since the engine speed is adjusted to the second target speed (1000 rpm) which is higher than the specified normal idle speed (750 rpm) but lower than the first target speed (1750 rpm) when the shift range position is shifted from P or N range to D range during the manual generation in the event the lapse of time C from the commencement of the manual regeneration is within the time range A–B and thereby it is presumed that the temperature of the particulate filter 12 is higher than the specified temperature T, the mount of exhaust gas flowing in the particulate filter 12 can be reduced, thereby suppressing increasing of the temperature of the particulate filter 12, avoiding any disadvantages of the start feeling of the vehicle.

Further, since the engine speed is adjusted to the normal idle speed (750 rpm) when the shift range position is shifted from P or N range to D range during the manual generation in the event that the lapse of time C from the commencement of the manual regeneration is shorter than the lapse of time A or longer than the lapse of time B and thereby it is presumed that the temperature of the particulate filter 12 is lower than the specified temperature T, the engine speed is adjusted so as to return to the normal idle speed (750 rpm) from the first target speed (1750 rpm) soon, deterioration of the fuel efficiency can be avoided properly.

Further, since the regeneration of the particulate filter 12 is performed by both the engine speed increasing by use of the main injection with increased fuel amount and the additional post injection, the exhaust gas temperature can be increased effectively and thereby the particulate filter 12 regeneration can be performed properly, preventing the engine speed from increasing too high due to the main injection with increased fuel amount.

Further, since it is warned to the passenger by the warning means that the mount of the exhaust particulates trapped by the particulate filter 12 reach the specified amount β, the passenger can switch on the manual regeneration switch 28 to commence the regeneration at its proper timing.

The present invention should not be limited to the above-described embodiments. Any other modifications can be applied within the scope of the claimed invention.

For example, although the above-described embodiments describe the example in which it is determined that the state of vehicle changes from the stop state to the driving state based on detecting of the shift range position from P or N range to D range, shift changing from P or N range to R range may be detected instead. Also, the present invention is applied to a vehicle equipped with a manual transmission, where the vehicle state changing from its stop state to its driving state may be determined based on detecting a manual shift change from its non-driving position to its driving position.

Also, although the above-described embodiments describe the example in which the regeneration of the trapped exhaust particulates by the particulate filter 12 is performed only when the vehicle is in the stop state and the manual regeneration switch is turned on, it may be also performed when the vehicle is in a running state.

For example, when it is determined that the amount of the trapped exhaust particulates by the particulate filter 12 exceeds a specified amount equivalent to its maximum amount to be trapped and when the engine operating condition is within a specified condition (for example, a medium-speed and medium-load engine operating condition), the post injection may be executed during the engine expansion stroke in addition to the main injection executed during the engine compression stroke. Accordingly, the temperature of the exhaust gas flowing in the particulate filter 12 may be increased due to the post combustion of fuel injected by the post injection, and thereby the exhaust particulates may be burned off.

Also, although the above-described embodiments describe the example in which the warning lamp 29 is used as a warning means, a warning buzzer may be used in stead. Further, in a vehicle equipped with a navigation system, a message for commencing the manual regeneration may be indicated on a display and the like of the navigation system.

What is claimed is:

1. An exhaust gas purification device of an engine for a vehicle, comprising;
   a filter member disposed in an exhaust passage of the engine to trap exhaust particulates in an exhaust gas;
   a temperature detecting device operative to detect a temperature of said filter member;
   a manual regeneration switch operative by a passenger to commence regeneration of said filter member;
   a shift range position detecting sensor operative to detect a shift range position of a shift device of the vehicle;

an engine speed adjusting device operative to adjust an engine speed; and a control unit operative to receive respective signals from said temperature detecting device, said manual regeneration switch and said shift range position detecting sensor, and output a control signal to said engine speed adjusting device, wherein said control unit is configured so as to output the control signal to adjust the engine speed in such manner that, (a) when said manual regeneration switch is operated and it is determined that the vehicle is in a stop state, the engine speed is adjusted to a first target speed which is higher than a specified normal speed and capable of substantially regenerating said filter member, (b) when said manual regeneration switch is operated and it is determined that a state of the vehicle changes from the stop state to a driving state, and
  (i) in the event that the temperature of said filter member is higher than a specified temperature, the engine speed is adjusted to a second target speed which is higher than said specified normal speed but lower than said first target speed,
  (ii) in the event that the temperature of said filter member is lower than said specified temperature, the engine speed is adjusted substantially to said normal engine speed.

2. The exhaust gas purification device of an engine for a vehicle of claim 1, wherein said engine speed adjusting device includes a fuel injector which is disposed at a combustion cylinder of the engine, and the engine speed is adjusted by controlling the amount of fuel injected by said fuel injector.

3. The exhaust gas purification device of an engine for a vehicle of claim 2, wherein there is provided an oxidation catalyst which is disposed in the exhaust passage upstream of said filter member, said fuel injector is configured so as to perform a main injection in which the fuel is injected during an engine compression stroke and a post injection in which the fuel is injected at near the top dead center of an engine expansion stroke, and the engine speed is adjusted by controlling the amount of fuel injected by the main injection.

4. The exhaust gas purification device of an engine for a vehicle of claim 1, said temperature detecting device comprises a temperature sensor to detect directly the temperature of said filter member.

5. The exhaust gas purification device of an engine for a vehicle of claim 1, said temperature detecting device is configured so as to detect indirectly the temperature of said filter member based on a lapse of time from the commencement of manual regeneration by said manual regeneration switch.

6. The exhaust gas purification device of an engine for a vehicle of claim 1, wherein said determination as to that the state of the vehicle changes from the stop state to the driving state is made at least based on the signal of said shift range position detecting sensor which relates to changing of a non-driving position from a driving position.

7. The exhaust gas purification device of an engine for a vehicle of claim 6, wherein said non-driving position is at least a P or N range, and said driving position is at least a D range.

8. The exhaust gas purification device of an engine for a vehicle of claim 1, further comprising a parameter value detecting device operative to detect a parameter value which corresponds to the amount of said exhaust particulates trapped by said filter member, and a warning means to warn the passenger to commence the regeneration of said filter member when it is determined that the parameter value detected by said parameter value detecting device is greater than a specified value.

* * * * *